United States Patent
Dixon

(10) Patent No.: US 10,606,475 B2
(45) Date of Patent: Mar. 31, 2020

(54) CHARACTER RECOGNITION METHOD, APPARATUS AND DEVICE

(71) Applicant: Apple Inc., Cupertino, CA (US)

(72) Inventor: Ryan S. Dixon, Mountain View, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 16/181,296

(22) Filed: Nov. 5, 2018

(65) Prior Publication Data

US 2019/0138198 A1    May 9, 2019

Related U.S. Application Data

(63) Continuation of application No. 15/264,040, filed on Sep. 13, 2016, now Pat. No. 10,146,429.

(60) Provisional application No. 62/348,825, filed on Jun. 10, 2016.

(51) Int. Cl.
*G06F 3/0488* (2013.01)
*G06K 9/00* (2006.01)
*G06T 11/20* (2006.01)
*G06K 9/22* (2006.01)

(52) U.S. Cl.
CPC ..... *G06F 3/04883* (2013.01); *G06K 9/00865* (2013.01); *G06K 9/222* (2013.01); *G06T 11/206* (2013.01)

(58) Field of Classification Search
None
See application file for complete search history.

(56) References Cited

U.S. PATENT DOCUMENTS

| | | | |
|---|---|---|---|
| 2015/0169975 A1* | 6/2015 | Kienzle | G06K 9/34 382/189 |
| 2016/0155251 A1* | 6/2016 | Borley | G06T 11/206 345/440 |

* cited by examiner

*Primary Examiner* — Gustavo Polo
(74) *Attorney, Agent, or Firm* — Morgan, Lewis & Bockius LLP

(57) ABSTRACT

Some embodiments of the invention provide a novel method for recognizing characters that are input through touch strokes on a touch-sensitive sensor (e.g., a touch-sensitive display screen or a touch-sensitive surface) of a device (e.g., a mobile device, a remote control, a trackpad, etc.). In some embodiments, the sensor has a space-constrained area for receiving the touch input. In some embodiments, the method places no limitations on where the user can write in the space provided by the device. As such, successive characters might not follow each other in the space. In fact, later characters might overlap earlier characters or they might appear before earlier characters.

21 Claims, 10 Drawing Sheets

CHARACTER RECOGNITION METHOD, APPARATUS AND DEVICE

CROSS-REFERENCE TO RELATED APPLICATIONS

The present application is a continuation of U.S. patent application Ser. No. 15/264,040, filed Sep. 13, 2016 and entitled "CHARACTER RECOGNITION METHOD, APPARATUS AND DEVICE," which claims the benefit of priority of U.S. Provisional Patent Application No. 62/348,825, filed Jun. 10, 2016, the contents of each of which are hereby incorporated by reference in their entireties for all purposes.

BACKGROUND

With proliferation of mobile devices with touch sensitive screens, users are enjoying numerous applications of numerous kinds that can be run on their devices. Examples of such devices include smartphones, tablets, watches, remote controls, etc. Many of these applications require users to enter alphanumeric characters to provide their inputs. However, the mobile devices have small display screens and hence are space constrained for displaying a keyboard or displaying an area to receive the alphanumeric character inputs.

BRIEF SUMMARY

Some embodiments of the invention provide a novel method for recognizing characters that are input through touch strokes on a touch-sensitive sensor (e.g., a touch-sensitive display screen or a touch-sensitive surface) of a device (e.g., a mobile device, a remote control, a trackpad, etc.). In some embodiments, the sensor has a space-constrained area for receiving the touch input. In some embodiments, the method places no limitations on where the user can write in the space provided by the device. As such, successive characters might not follow each other in the space. In fact, later characters might overlap earlier characters or they might appear before earlier characters.

In some embodiments, the method detects a plurality of stroke inputs, with each stroke input having a touch-down location and a touch-up location on the sensor surface. The method creates a stroke-segmentation graph with several nodes and several edges between the nodes. Each node corresponds to at least one stroke's touch-down location or one stroke's touch-up location. In some embodiments, each interior node of the graph corresponds to a touch-up location of an earlier stroke and a touch-down location of the next subsequent stroke.

In some embodiments, the method not only defines edges in the stroke-segmentation graph between pairs of adjacent nodes but also defines, whenever applicable, edges between pairs of non-adjacent nodes. The method defines edges between pairs of non-adjacent nodes because users may use multiple strokes to input a single character. Specifically, while a user might input one character with one single contiguous stroke, the user might need to use multiple different strokes to input another character, which requires the method to explore edges between non-contiguous nodes in the stroke-segmentation graph and to define such edges when they could be viably used to define one or more characters. These characters are referred to below as multi-stroke characters.

For each edge in the stroke-segmentation graph, the method defines a set of candidate characters represented by the edge and associates a score for each candidate character. To represent the set of candidate characters, the method of some embodiments creates a candidate-character graph from the stroke-segmentation graph. The candidate-character graph has the same nodes as the stroke-segmentation graph, but for each edge of the node graph, the candidate-character graph can include one or more candidate edges, with each candidate edge representing one candidate character. Each candidate edge in these embodiments is assigned the score of its associated candidate character.

In some embodiments, the method explores different paths through the candidate-character graph to identify a string of one or more characters that most likely represents the string (e.g., the word, the number, the alphanumeric entry, etc.) that the user inputs through a set of touch stroke inputs on the touch-sensitive sensor. Each explored path traverses through a set of nodes in the candidate-character graph by using a set of candidate-character edges defined in this graph. The method in some embodiments computes a score for each path based on the scores of the candidate-character edges that the path uses. The method then selects the path with the best computed path score (e.g., the highest path score when a higher score is a better score, or the lowest path score when a lower score is a better score) as the path that includes the characters that most likely correspond to the current character string that the user has entered through the set of touch stroke inputs on the sensor.

Each time the method adds a new edge to the stroke-segmentation graph, the method in some embodiments defines a set of candidate-character edges to the candidate-character graph, scores the newly defined candidate-character edges and then re-examines the paths through the candidate-character edges to identify the path that represents the most likely character string that the user is in the process of entering or has completed its entry. After assessing the paths that best represent individual input strings (e.g., individual words), the method of some embodiments performs a multi-string (e.g., a multi-word) analysis on the paths to identify the set of paths that best represent the multi-string input that the user has entered through the set of touch stroke inputs on the sensor.

To define the edges in the stroke-segmentation graph, and to define the edges in the candidate-character graph, the method of some embodiments accounts for several different types of constraints. For instance, in some embodiments, the method accounts for spatial, temporal, language and stroke count constraints that limit the number of edges defined in the stroke-segmentation graph and/or the candidate-character graph. For example, if two successive strokes are 1 and 3, and they occur within a first temporal duration and a second location proximity, the method would define an edge between two non-adjacent nodes in the stroke graph, and this edge can be used to define an edge in the candidate-character graph to represent B. On the other hand, when the two successive strokes for 1 and 3 do not occur within the first temporal duration or are not written within the second location proximity, the method in some embodiments does not define an edge between the two non-adjacent pair of nodes. In still other embodiments, the method creates the edge in the stroke-segmentation graph that treats these two strokes (for 1 and 3) as one multi-stroke input (i.e., does not filter out this edge because of spatial and temporal constraints), but then uses the spatial and/or temporal constraints to determine whether it should generate a candidate-character edge in the candidate graph to represent the candidate B.

In some embodiments, the method does not consider single stroke combinations greater than a particular value (e.g., 3 single strokes), as the number of generated multi-stroke characters would be too large to analyze quickly, especially given that the device that performs the character recognition method might have limited resources in general or might have limited resources to devote to the character recognition operation. The stroke count in some embodiments is dependent on the language being detected. Also, the detected language is also used to limit the number of candidate edges that would be generated for an edge in a stroke-segmentation graph.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a device that executes a character recognition process to recognize characters that are input through touch strokes on a touch-sensitive sensor. In some embodiments, the device is a mobile device (e.g., a smartphone, a tablet, a watch, etc.) with a touch-sensitive display screen. In other embodiments, the device is a computer, trackpad or other device with a touch-sensitive sensor. In still other embodiments, the device is a remote with a touch-sensitive section, or is a media-streaming device that has such a remote.

In some embodiments, the sensor has a space-constrained area for receiving the touch input. In some embodiments, the device's character-recognition process places no limitations on where the user can write in the space provided by the device. As such, successive characters might not follow each other in the space. In fact, later characters might overlap earlier characters or they might appear before earlier characters.

In some embodiments, the character-recognition process detects a plurality of stroke inputs, with each stroke input having a touch-down location and a touch-up location on the sensor surface. A stroke's touch-down location corresponds to the location on the sensor surface that the stroke input initially touch, while the stroke's touch-up location corresponds to the location on the sensor surface where this touch input ended.

Figure 1:
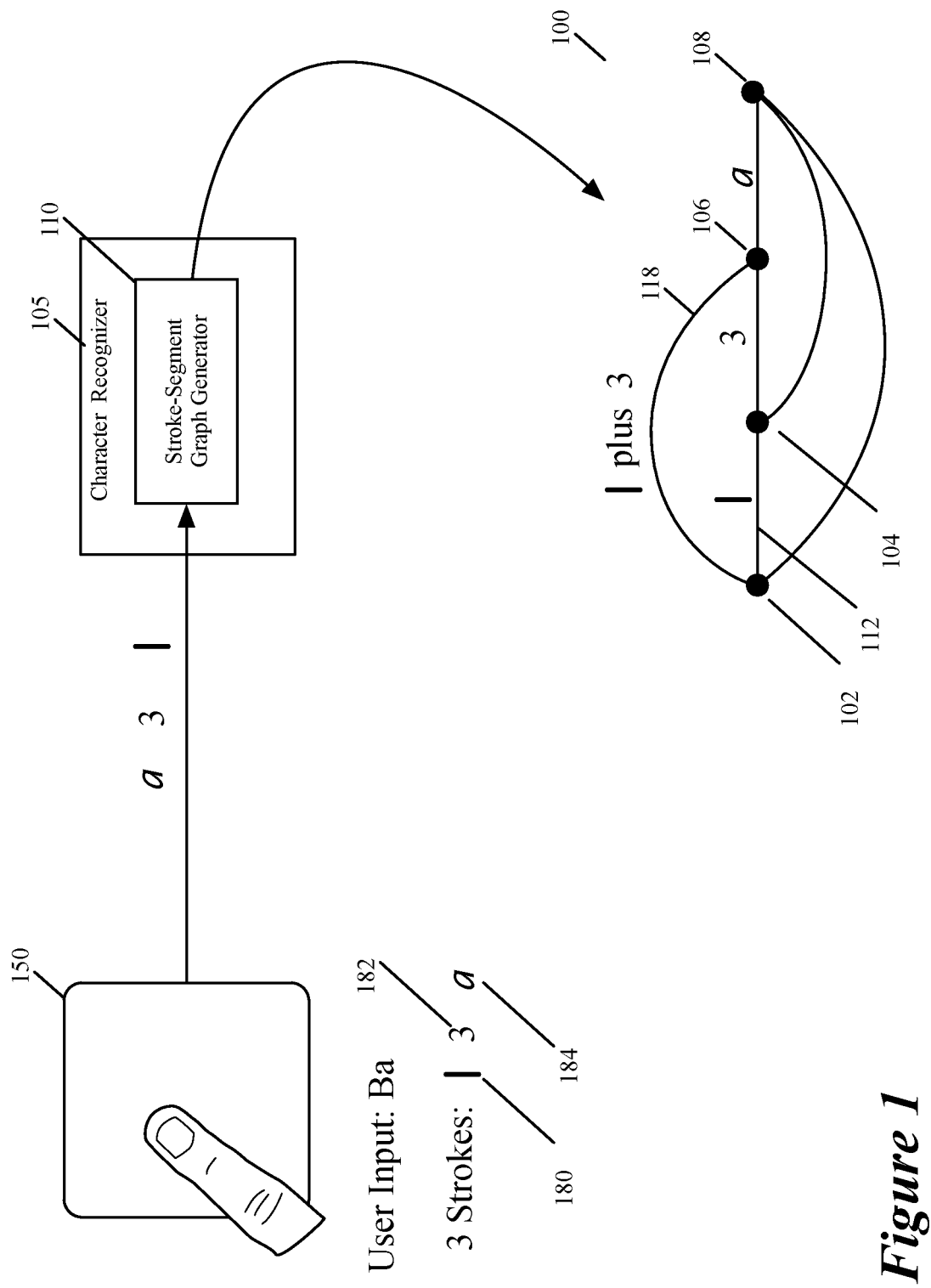
FIG. 1 illustrates an example of a stroke-segmentation graph 100.

The character-recognition process creates a stroke-segmentation graph with several nodes and several edges between the nodes. FIG. 1 illustrates an example of a stroke-segmentation graph 100. This graph is created by a stroke-segment graph generator 110 of a character recognizing module 105 (called character recognizer) that performs the character-recognition process of some embodiments.

The stroke-segment graph generator 110 has created this graph in response to the user entering Ba on a touch-sensitive surface 150 through three strokes 180, 182, and 184. Each node in this graph 100 corresponds to at least one stroke's touch-down location or one stroke's touch-up location. In some embodiments, each interior node of the graph corresponds to a touch-up location of an earlier stroke and a touch-down location of the next subsequent stroke.

In some embodiments, the graph generator 110 not only defines edges in the stroke-segmentation graph between pairs of adjacent nodes but also defines, whenever applicable, edges between pairs of non-adjacent nodes. The graph generator 110 defines edges between pairs of non-adjacent nodes because users may use multiple strokes to input a single character. Specifically, while a user might input one character with one single contiguous stroke, the user might need to use multiple different strokes to input another character, which requires the graph generator 110 to explore edges between non-contiguous nodes in the stroke-segmentation graph and to define such edges when they could be viably used to define one or more characters. Characters that are input through a single stroke are referred to below as single-stroke characters, while characters that require multiple input strokes are referred to below as multi-stroke characters.

FIG. 1 illustrates several examples of edges between contiguous nodes and non-contiguous nodes in the stroke-segmentation graph. For instance, the edge 112 is an edge between contiguous nodes 102 and 104, while the edge 118 is an edge between non-contiguous nodes 102 and 106. An edge between a contiguous node pair in the graph 100 represents a single input stroke, while an edge between a non-contiguous node pair in this graph represents a multi-stroke input.

In some embodiments, the stroke-segment graph generator 110 does not create an edge in the stroke-segmentation graph that connects a pair of non-contiguous nodes that are more than a certain number of nodes from each other (e.g., do not define edges between non-contiguous pair of nodes that have more than 2 intervening nodes between them). This is because the graph generator 110 does not consider single stroke combinations greater than a particular value (e.g., 3 single strokes), as the number of generated multi-stroke characters would be too large to analyze quickly, especially given that the device that performs the character recognition process might have limited resources in general or might have limited resources to devote to the character recognition process. The stroke count in some embodiments is dependent on the language being detected.

In some embodiments, the stroke-segment graph generator 110 does not create an edge in the stroke-segmentation graph to represent a multi-stroke character between two non-contiguous nodes (e.g., nodes 104 and 108) when more than a threshold amount of time exists between two of the strokes in the multi-stroke input (i.e., two of the strokes do not satisfy a timing constraint). Also, in some embodiments, the stroke graph generator 110 does not generate such an edge between two non-contiguous nodes when two of the strokes of the multi-stroke input are too far apart (i.e., two of the strokes do not satisfy a spatial constraint).

Figure 2:
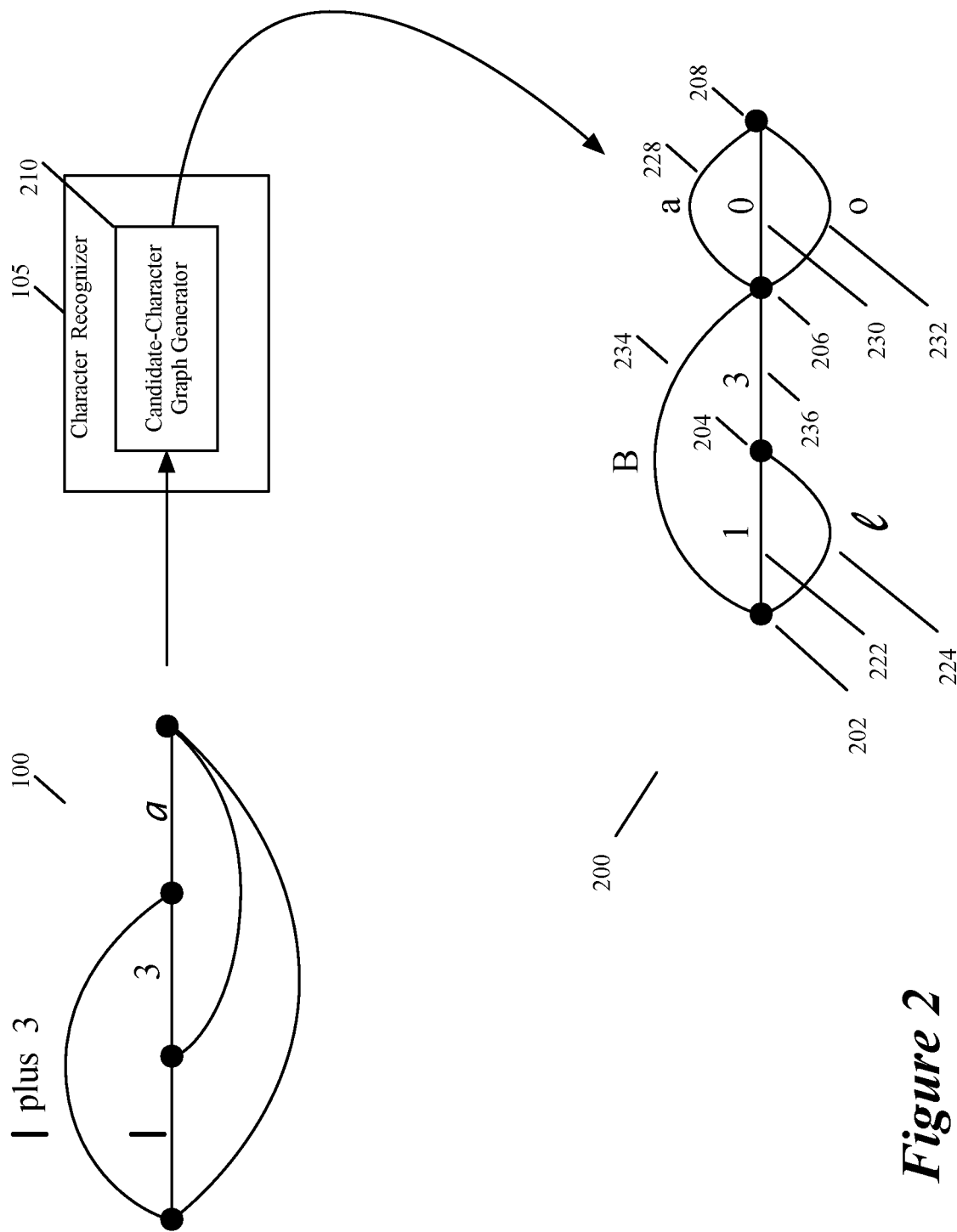
FIG. 2 illustrates an example of a candidate-character graph, which is created by a candidate graph generator of a character recognizer of some embodiments.

For each edge in the stroke-segmentation graph, the character recognizer 105 defines a set of candidate characters represented by the edge and associates a score for each candidate character. To represent the set of candidate characters, the character recognizer of some embodiments creates a candidate-character graph from the stroke-segmentation graph. FIG. 2 illustrates an example of a candidate-character graph 200, which is created by a candidate graph generator 210 of the character recognizer 105 of some embodiments.

The candidate graph generator 210 creates the candidate graph 200 from the stroke-segmentation graph 100 (i.e., after the user enters Ba on the touch-sensitive surface 150 through the three strokes 180, 182, and 184). The candidate-character graph has the same number of nodes 202-208 as the stroke-segmentation graph, but for each edge of the node graph, the candidate-character graph can include one or more candidate graph edges, with each candidate edge representing one candidate character. Each candidate edge in these embodiments is assigned the score of its associated candidate character.

As shown, the candidate graph 200 has two edges 222 and 224 for the edge 112 in the stroke graph 100, and three edges 228, 230 and 232 for the edge 116 in the stroke graph 100. The two edges 222 and 224 respectively specify the number 1 and lower case L as candidate characters for the first stroke 180 represented by edge 112, while the three edges 228, 230 and 232 respectively specify the lower case A, the number 0, and the lower case O for the third stroke 184. Candidate edge 234 specifies upper case B for the multi-stroke input that is represented by the edge 118 in the stroke graph 100 to represent the combination of the first two strokes 180 and 182. Candidate edge 236 specifies the number 3 to represent the second stroke 182, which is represented as edge 114 in the stroke graph 100.

In some embodiments, the character-recognition process explores different paths through the candidate-character graph to identify a string of one or more characters that most likely represents the string (e.g., the word, the number, the alphanumeric entry, etc.) that the user inputs through a set of touch stroke inputs on the touch-sensitive sensor. Each explored path traverses through a set of nodes in the candidate-character graph by using a set of candidate-character edges defined in this graph. The character-recognition process in some embodiments computes a score for each path based on the scores of the candidate-character edges that the path uses. The character-recognition process then selects the path with the best computed path score (e.g., the highest path score when a higher score is a better score, or the lowest path score when a lower score is a better score) as the path that includes the characters that most likely correspond to the current character string that the user has entered through the set of touch stroke inputs on the sensor.

Figure 3:
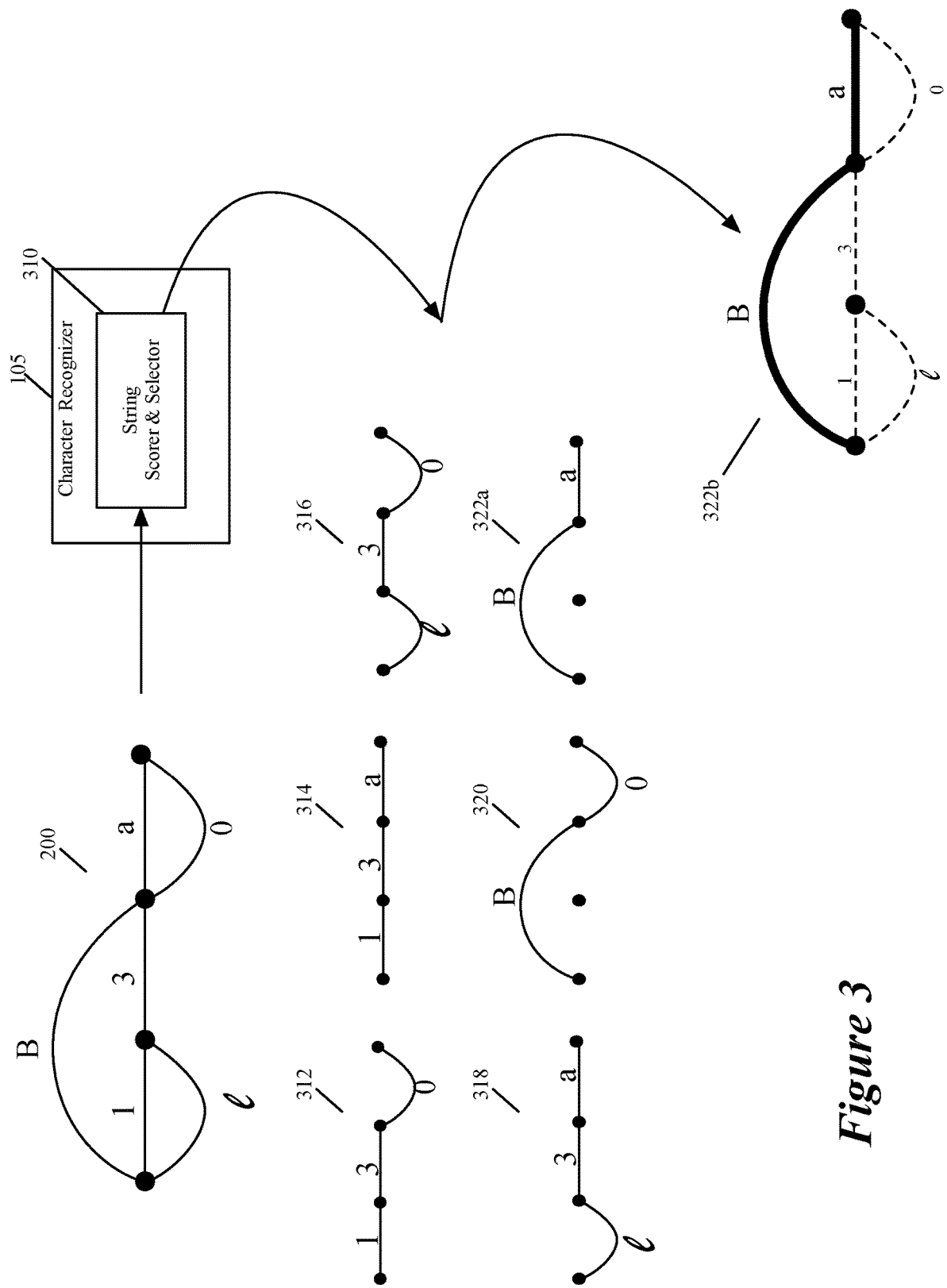
FIG. 3 illustrates an example of a string selector of the character recognizer of some embodiments exploring different paths through the generated candidate graph before selecting the path as the best path through this graph.

FIG. 3 illustrates an example of a string selector 310 of the character recognizer 105 of some embodiments exploring different paths 312-322 through the generated candidate graph 200 before selecting the path 322 as the best path through this graph. Unlike the other paths 312-320, this figure illustrates the path 322 twice, (1) once 322a on its own to show its identification and scoring while all the paths are being identified and scored, and (2) once 322b with thick lines after it has been selected as the current best path.

In the latter representation 322b, the path 322 is illustrated on a graph that shows the other candidate edges in the candidate graph with dashed lines. This latter representation is meant to highlight that the string selector 310 might select different paths that uses different sets of edges in the candidate graph after subsequent strokes are entered by the user. The path 322 just happens to be the current best path through the candidate graph.

More specifically, in some embodiments, each time the stroke graph generator 110 adds a new node and a new edge to the stroke-segmentation graph 100, the candidate graph generator 210 (1) defines a new node and a set of candidate-character edges to the candidate-character graph 200 (which corresponds to the new node and new edge in the stroke graph 100), and (2) scores the newly defined candidate-character edges. The string selector 310 then re-examines the paths through the candidate-character edges to identify the path that represents the most likely character string that the user is in the process of entering or has completed its entry. These explored paths use one of the edges that the candidate graph generator 210 just generated for the new stroke.

After assessing the paths that best represent individual input strings (e.g., individual words), the character-recognition process of some embodiments performs a multi-string (e.g., a multi-word) analysis on the paths to identify the set of paths that best represent the multi-string input that the user has entered through the set of touch stroke inputs on the sensor. As further described below, the character recognizer 105 in some embodiments has a multi-string selector that identifies the set of paths that specifies the multi-string input that best represents the touch stroke inputs that the user has entered thus far. In some embodiments, the character recognizer also has a string presenter that identifies two or more of the best paths through the generated candidate graph to present a collection of two or more candidate strings or candidate multi-string entries on a user interface (UI) so that the user can select one of the presented strings and cut short the entries. Based on pre-tabulated strings, the string presenter in some embodiments auto-completes strings or multi-string entries, as further described below.

To define the edges in the stroke-segmentation graph, and to define the edges in the candidate-character graph, the character recognizer 105 of some embodiments accounts for several different types of constraints. For instance, in some embodiments, the character recognizer accounts for spatial, temporal, language and stroke count constraints that limit the number of edges defined in the stroke-segmentation graph and/or the candidate-character graph. For example, if two successive strokes are 1 and 3 occur within a first temporal duration and a second location proximity, the character recognizer would define an edge between two non-adjacent nodes of the stroke graph, and this edge can be used to define an edge in the candidate-character graph to represent B.

On the other hand, when the two successive strokes for 1 and 3 do not occur within the first temporal duration or are not written within the second location proximity, the character recognizer in some embodiments does not define an edge between the two non-adjacent pair of nodes. In still other embodiments, the character recognizer creates the edge in the stroke-segmentation graph that treats these two strokes (for 1 and 3) as one multi-stroke input (i.e., does not filter out this edge because of spatial and temporal constraints), but then uses the spatial and/or temporal constraints during the character recognition phase to determine that it should not generate a candidate-character edge in the candidate graph to represent the candidate B. Also, the detected language is also used to limit the number of candidate edges that would be generated for an edge in a stroke-segmentation graph.

Figure 4:
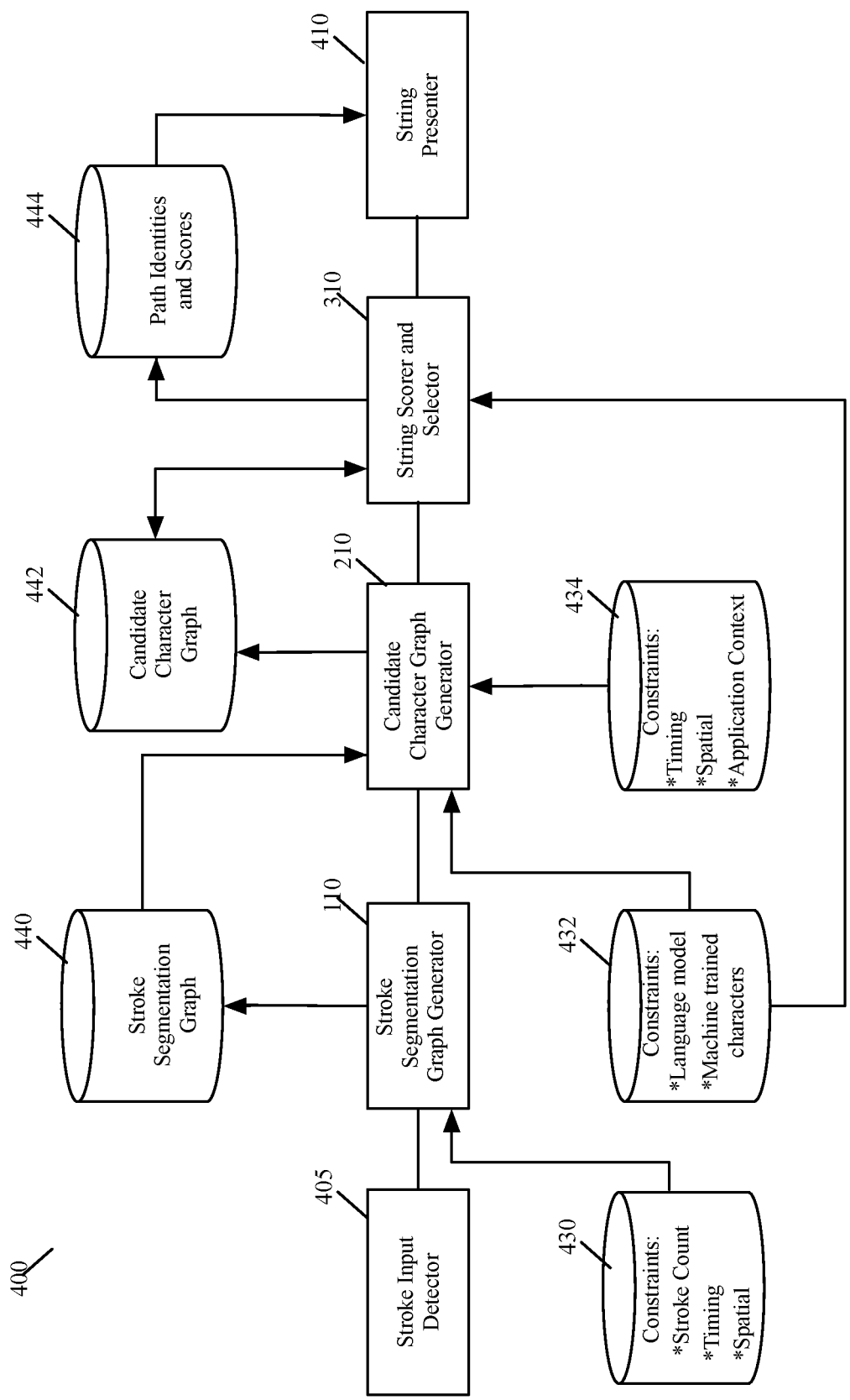
FIG. 4 illustrates a more detailed view of the character recognizer of some embodiments of the invention.

FIG. 4 illustrates a more detailed view of the character recognizer 400 of some embodiments of the invention. As shown, the character recognizer includes a stroke input detector 405, a stroke-segmentation graph generator 110, a candidate-character graph generator 210, a string selector 310, and a string presenter 410. To perform their operations, these modules use constraints stored in storages 430, 432, and 434, and store the results of their operations in storages 440, 442, and 444.

Figure 5:
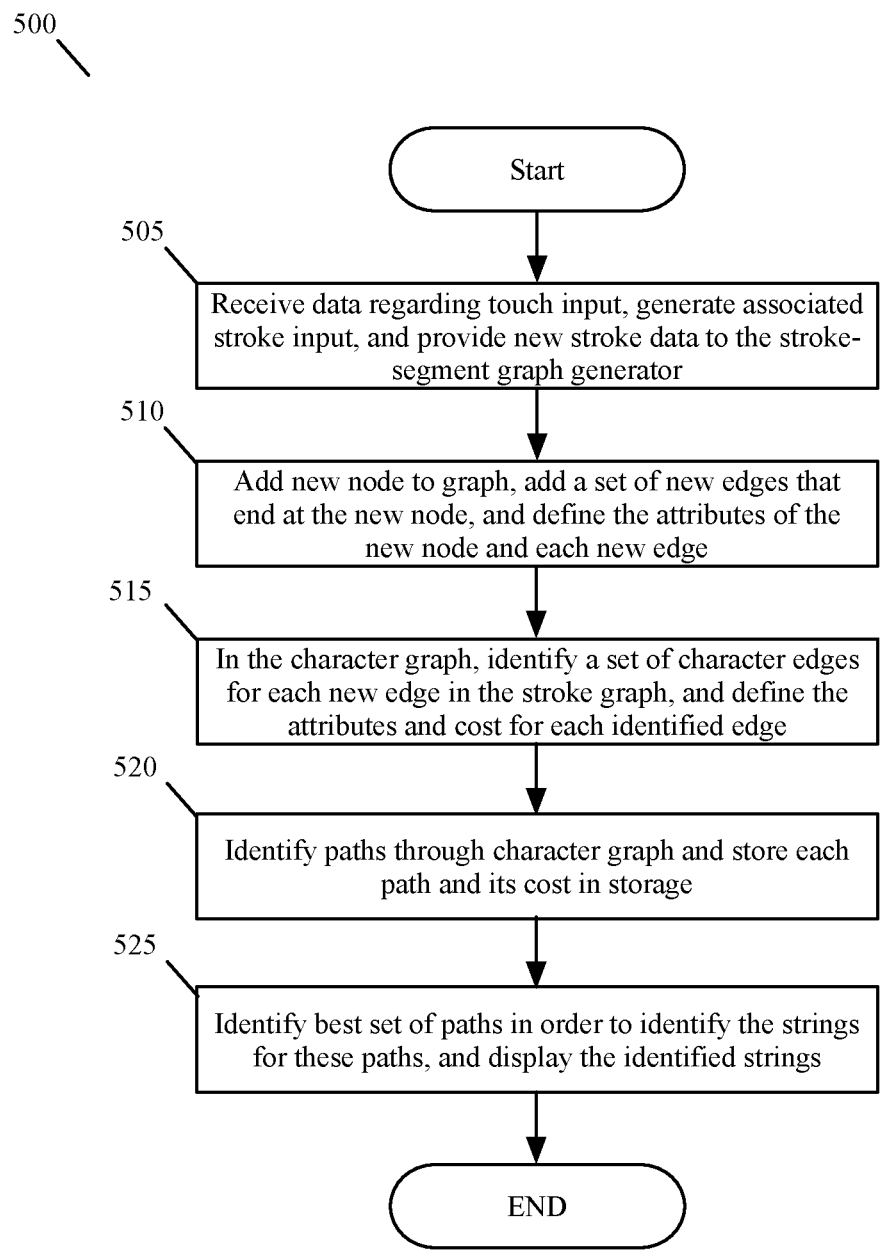
FIG. 5 illustrates a process performed by the character recognizer of some embodiments.

The operation of the character recognizer 400 will be described by reference to the process 500 of FIG. 5. This process shows the sequence of operations that the character recognizer 400 performs each time it identifies a new stroke that the user inputs through the touch sensitive sensor of the device. Once a user starts a new stroke by touching down on this sensor, the stroke input detector 405 receives (at 505) data from the touch input from the device's OS framework for capturing and processing touch input from the touch sensitive sensor. When the user ends the stroke (i.e., performs a touch-up operation), the stroke input detector 405 (at 505) identifies the end of the stroke, informs the stroke-segment graph generator 110 of this stroke, and supplies this generator with information that describes this stroke. The supplied information in some embodiments includes the touch-down and touch-up locations of the stroke, the time associated with the touch-down and touch-up events, and the geometry that was produced by the stroke (which in some embodiments is expressed in terms of a collection of sample points along the stroke).

In some embodiments, each node of the stroke graph 100, other than the first and last node, represents both a touch-up event of an earlier stroke and a touch-down event of the next subsequent stroke. Accordingly, for the newly detected stroke, the stroke-segment graph generator 110 (at 510) (1) updates the attributes of the last previously added node of the stroke graph 100 to include the attributes (e.g., location, time, etc.) of the newly reported touch-down event, and (2) adds a new node to the stroke graph 100 and adds the attributes (e.g., location, time, etc.) of the newly reported touch-up event to this new node's attributes. As shown, the stroke graph generator 110 stores the stroke graph 100 in storage 440 in some embodiments.

At 510, the stroke graph generator 110 also adds one or more edges that connect the new node to previously defined neighboring and non-neighboring nodes that could serve as the basis to define viable candidate-character edges in the candidate-character graph 200. To define the edges in the stroke-segmentation graph, the stroke graph generator 110 of some embodiments accounts for several different types of constraints that are stored in the constraint storage 430 and language model storage 432.

One of these constraints is the stroke count constraint stored in the storage 430. This constraint specifies the largest number of single stroke combinations that the stroke graph generator 110 can combine into a single multi-stroke input that it represents as one edge that connects two non-adjacent nodes (also called non-contiguous or non-neighboring nodes in this document) in the stroke graph 100. This constraint causes the stroke-segment graph generator 110 to not even consider any edge that would connect a pair of non-contiguous nodes that are more than a certain number of nodes from each other (i.e., that have more than N intervening nodes between them). This constraint frees the stroke graph generator 110 from exploring multi-stroke combination that would be too large to analyze quickly, especially given that the device that performs the character recognition process might have limited resources in general or might have limited resources to devote to the character recognition process.

Spatial and timing constraints in the storage 430 are other constraints that cause the stroke graph generator 110 from generating edges between non-adjacent node pairs that are within the threshold node distance specified stroke count constraint. For example, when two successive strokes are 1 and 3, and they do not occur within a temporal duration threshold and a location proximity threshold, the stroke graph generator 110 does not define an edge between the two non-adjacent nodes of the stroke graph 100 (they correspond to the touch-down event of the 1 stroke and the touch-up event of the 3 stroke). On the other hand, the spatial and timing constraints of the stroke graph generator 110 might allow this multi-stroke edge to be created, but the spatial and/or timing constraints of the candidate graph generator 210 might then preclude a candidate character to be defined for this edge. In some embodiments, the stroke graph generator 110 and the candidate graph generator 210 use different spatial and/or timing constraints.

After the stroke graph generator identifies (at 510) new node and associated set of edges for the newly detected stroke, it directs (at 515) the candidate graph generator 210 to identify a set of one or more characters for each newly identified edge and compute a score for each identified candidate character. As shown, the candidate graph generator 210 accesses the storage 440 to retrieve the stroke graph 100 that the stroke graph generator 110 just updated, and accesses the storage 445 to store and access the candidate character graph 200 that it generates to maintain the candidate characters that it identifies. As mentioned above, the candidate-character graph 200 in some embodiments has the same nodes as the stroke-segmentation graph, but for each edge of the node graph, the candidate-character graph can include one or more candidate graph edges, with each candidate edge representing one candidate character. Each candidate edge in these embodiments is assigned a score that quantifies the likelihood that edge's associated candidate character is the actual character that the user entered or wanted to enter.

As shown in FIG. 4, the character graph generator 210 accounts for several different types of constraints that are stored in the constraint storage 434 and the language model storage 432, in order to define the edges in its character candidate graph 200. Spatial and timing constraints in the storage 434 are two types of constraints that the character graph generator 210 uses in some embodiments to identify candidate characters, and to generate candidate character edges in the character graph 200, for edges in the stroke graph 100.

For example, as described above, when the user inputs 1 and 3 in two successive strokes that are within a threshold time period of each other and are within a certain spatial distance of each other, the character graph generator 210 would define B as a candidate character for the combination of these strokes and defines an edge in the candidate graph 200 between the two nodes that represent the touch-down event for input 1 and the touch-up event for input 3. On the other hand, when these two strokes do not meet either the temporal or spatial constraint, the character graph generator 210 does not generate an edge in its candidate graph to represent B as a candidate character, as too much time passed between the strokes, or these strokes were too far apart, to imply that the user wanted them to be treated as one multi-stroke input. In some embodiments, the stroke graph generator and candidate graph generator identify the temporal and spatial properties of a node, an edge, or a stroke based on the attributes that are stored for these constructs in the stroke graph 100 and the character graph 200.

In some embodiments, the spatial constraints that the character graph generator 210 uses include geometric constraints that allow this generator to differentiate between upper and lower case characters (e.g., between O and o), between characters and punctuation, and between different punctuation (e.g., comma versus apostrophe). The character graph generator 210 generates edges for the characters that it differentiates with the geometric constraints (e.g., generates candidate edges for O and o) but assigns scores to these edges commensurate with the likelihood of their accuracy based on the geometric constraints.

In some embodiments, the constraint storage 434 also includes application constraints that can limit the type of characters that the character graph generator 210 defines for its character graph 200. The character graph generator in some embodiments is biased towards predicting the user's intent instead of acting as a typewriter and just reproducing the user's input. For instance, users often enter certain characters in upper case, when they really would like to enter the character in lower case. One example of this would be a user entering "hEllo" when his intent was to enter "hello." Thus, in many settings and for many text fields, the character graph generator 210 produces character strings based on what it predicts was the user's intent regarding the upper or lower case setting of the entered characters. However, for certain fields (e.g., a username field or password field), the graph generator 210 ignores the settings that bias it to capture the user's intent, and switches to a typewriter mode in which it directly reproduces the user's entries without changing the upper or lower case settings.

Another such example would be about entering numerical and alphabetical characters. Typically, for most fields, the graph generator 210 might operate based on settings that direct it to treat numerical and alphabetical characters the same. However, when the user is trying to populate a field that is only associated with numbers (e.g., to make a phone call), the graph generator 210 might switch to a setting that directs it to treat each stroke entry as an entry that would define a number.

The character graph generator 210 also uses the language model constraints that are defined in storage 432 to identify possible characters that can be specified for a geometry that is specified by a single stroke edge or a multi-stroke edge in the stroke graph 100. In some embodiments, these constraints define the possible viable candidates for defining characters for single stroke geometries or multi-stroke geometries. In some embodiments, the language constraint storage 432 stores for each possible alphanumeric character that can be entered, a set of geometric shapes that the user might enter for the character. In some of these embodiments, the sets of geometric shapes for the characters are produced through supervised machine learning based on the types of strokes that the users would employ when touching the device. When the device has a particular form factor (e.g., is a watch or is a remote) that allows it to be held by the user while the user is inputting characters through its touch-sensitive sensor, the machine-trained types of strokes account for the likely way that the user will make the touch input (e.g., with his thumb) while holding the device.

After defining (at 515) the candidate edges, the character graph generator 210 directs (at 520) the string selector 310 to identify different paths through the character graph 200 that specify different possible character strings (e.g., different words, different numbers, etc.) that the user may have entered. Each identified path is defined in terms of a set of character edges in the character graph 200 that the path traverses. The set of characters associated with the set of character edges of the path then provide the character values of the character string represented by the path. For example, in the example illustrated in FIG. 3, the path 322 is defined in terms of edges 234 and 228, which are associated with "B" and "a". Hence, the path 322 specifies a partial input string "Ba".

To identify the different paths, the string selector 310 uses the character edge scores that the character graph generator 210 assigned to the edges to compute the score for the paths that use these edges (e.g., identifies for each possible path, a path score based on the scores of the character edges that the path uses). For example, in some embodiments, a path's computed score is the sum of the scores of the character candidate edges that the path traverses in the candidate graph 200.

In some of these embodiments, the string selector 310 can adjust the edge scores of earlier character edges based on character edges that are later defined, as these later defined character edges make certain string candidates more likely than other string candidates, and these more likely string candidates make certain candidate characters more likely than other candidate characters. In other embodiments, the string selector 310 just uses the character edge scores computed by the candidate graph generator 210, and does not adjust the candidate character edge scores. In some of these embodiments, the candidate character graph generator 210 adjusts the edge scores of earlier character edges based on character edges that are later defined, as these later defined character edges make certain character candidate combinations more likely than other character candidate combinations.

At 520, the string selector 310 stores the identity of the paths that it identifies in the path data storage 444. For each path, the string selector 310 stores the path's score in the storage 444. In the path storage 444, the string selector 310 also stores complete strings that it identifies for partial strings of paths that it identifies. Specifically, in some embodiments, the string selector uses language models and machined trained string sets in the storage 432 to perform (at 520) an auto-complete operation that identifies one or more possible complete strings that finish the input string of each newly identified path that is not yet complete. The auto-complete operation in some embodiments generates a score for each candidate complete string that it identifies, and stores this score along with the candidate complete string in the path storage 444.

After 520, the string presenter 410 can display (at 525) a set of one or more candidate strings on a display screen. The displayed candidate strings are the strings that at the time of display were identified by the paths in the storage 444 that had the highest path scores at that time. The displayed candidate strings in some embodiments include strings produced by the auto-complete operation of the string selector 310.

In some embodiments, a user has to direct the string presenter 410 to display the set of candidate strings. For instance, in some embodiments, a smart watch executes the character recognizer 400 in order to generate characters that the user inputs through touch strokes on the watch's touch-sensitive display screen. In some of these embodiments, the smart watch displays the candidate strings produces by the string presenter when the user selects one of the watch's controls (e.g., actuates the crown of the watch). In other embodiments, the string presenter does not need to be prompted to display the best candidate strings on a display screen, and performs this automatically each time it detects that the string selector has identified a new set of paths and/or modified a previously specified set of paths.

The character recognizer of some embodiments not only has a string selector that identifies paths that correspond to a single-string input, but also has a multi-string selector that identifies paths that correspond to a multi-string input. This multi-string selector is useful for allowing a user to enter multiple word or number strings without stopping to affirm each entered single string.

Figure 6:
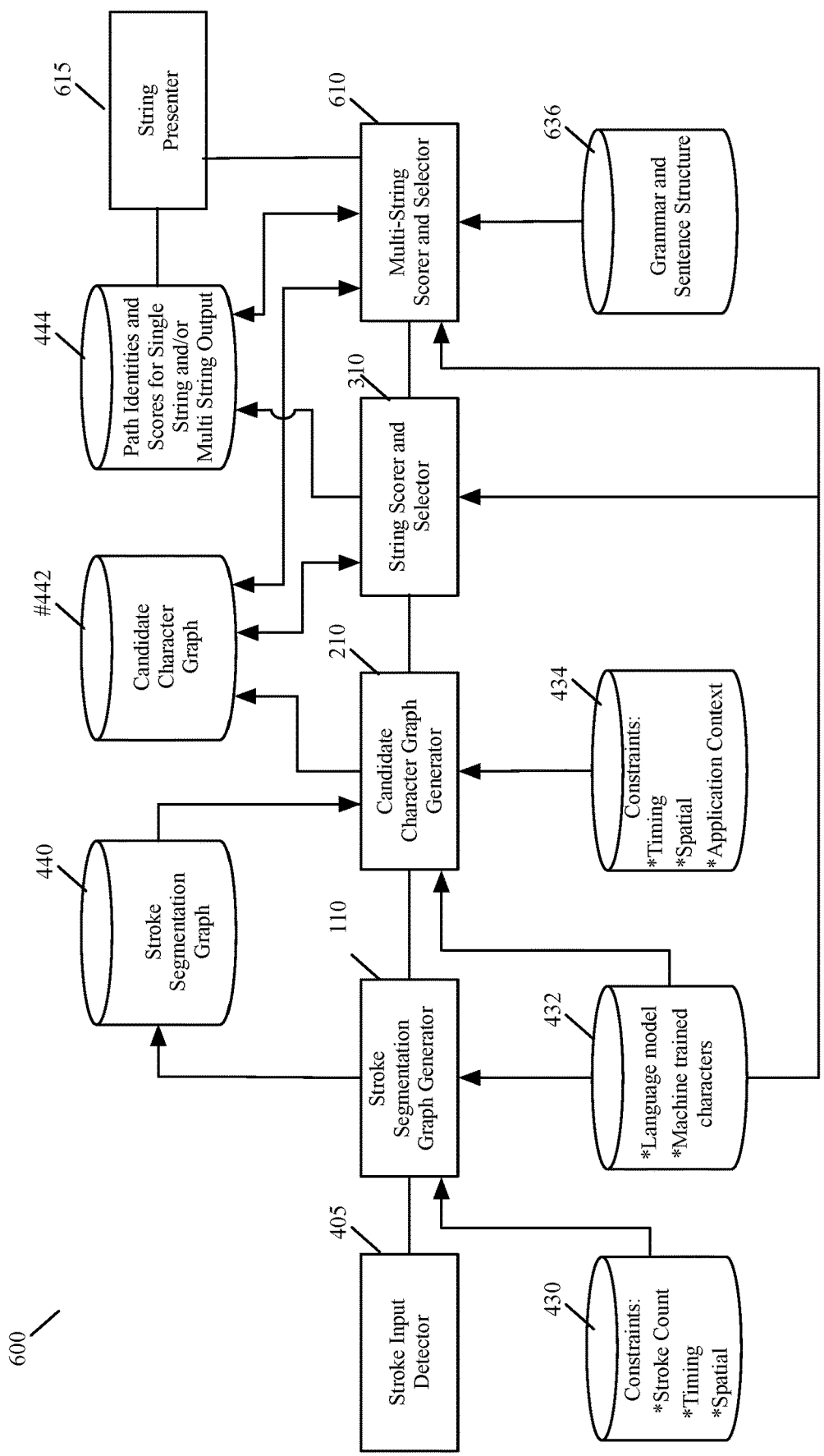
FIG. 6 illustrates an example of a character recognizer that has such a multi-string selector.

FIG. 6 illustrates an example of a character recognizer 600 that has such a multi-string selector 610. The character recognizer 600 is similar to the character recognizer 400 except for a few differences. First, to identify space between different strings in a multi-string input, the character graph generator 210 of the recognizer 600 in some embodiments includes spaces between strings in definition of a character associated with an edge in its character graph whenever applicable. In other embodiments, the character graph generator 210 creates an edge in its character graph to represent each possible space between two different strings, in order to specify a space between different strings.

Also, after the string selector 310 analyzes the paths through the candidate character graph 200 to identify single string paths, the multi-string selector 610 analyzes this graph to try to identify any path that specifies multiple input strings. Each identified multi-string path is defined by reference to two or more single string paths. In the embodiments that define an edge in the character graph to represent a space between strings, a multi-string path is also defined by reference to at least one character-graph edge that represents a space between two strings.

To perform its operations, the multi-string selector uses language model and machine trained rules in storage 432, and uses grammar and sentence structure rules stored in storage 636. The multi-string selector 610 stores the identity of the multi-string paths that identifies in the path data storage 444. For each path, this selector 610 stores the path's score in this storage 444. In some embodiments, a multi-string path's computed score is the sum of the candidate edges that the path traverses in the candidate graph 200.

In some of these embodiments, the multi-string selector 610 adjust the edge scores of earlier character edges based on character edges that are later defined, as these later defined character edges make certain multi-string candidates more likely than other multi-string candidates, and these more likely multi-string candidates make certain candidate strings and candidate characters more likely than other candidate strings and candidate characters. In other embodiments, the string selector 610 just uses the character edge scores computed by the candidate graph generator 210, and does not adjust the candidate character edge scores. In some of these embodiments, the candidate character graph generator 210 adjusts the edge scores of earlier character edges based on character edges that are later defined, as these later defined character edges make certain character candidate combinations more likely than other character candidate combinations.

Figure 8:
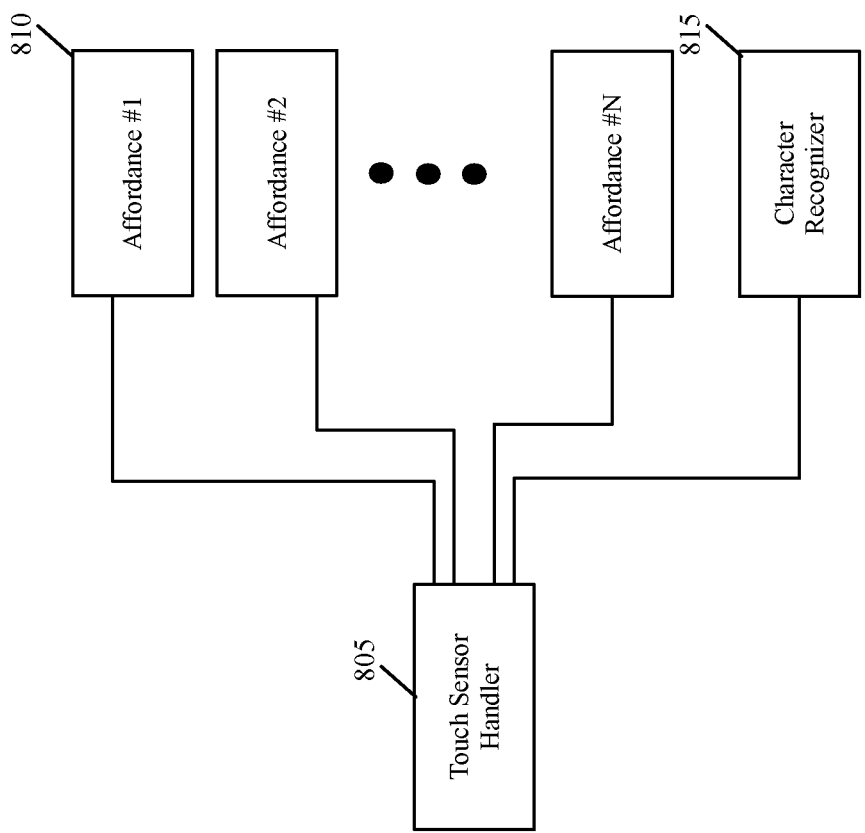
FIGS. 7-9 illustrate an example of a smart watch that executes the character recognizer of some embodiments of the invention.
Figure 7:
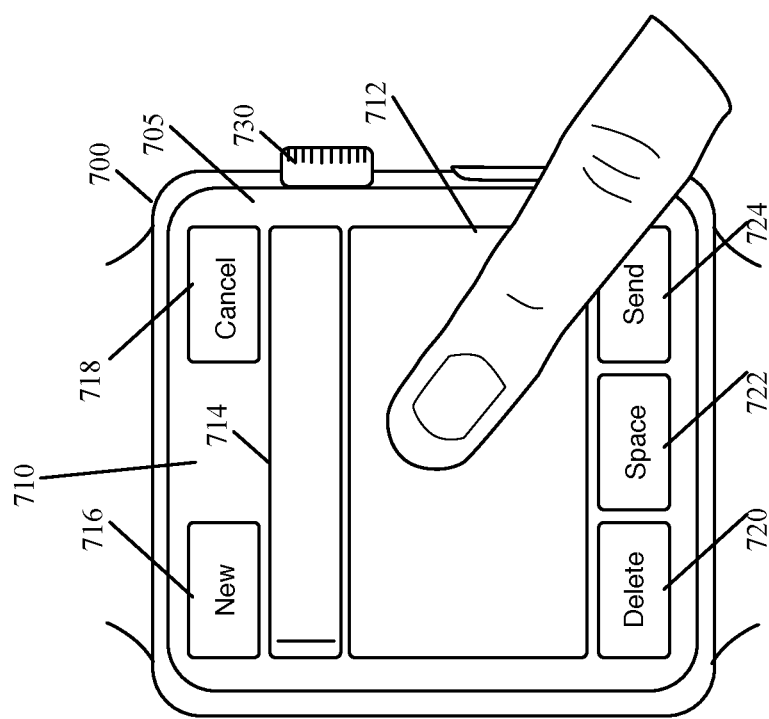
Figure 9:
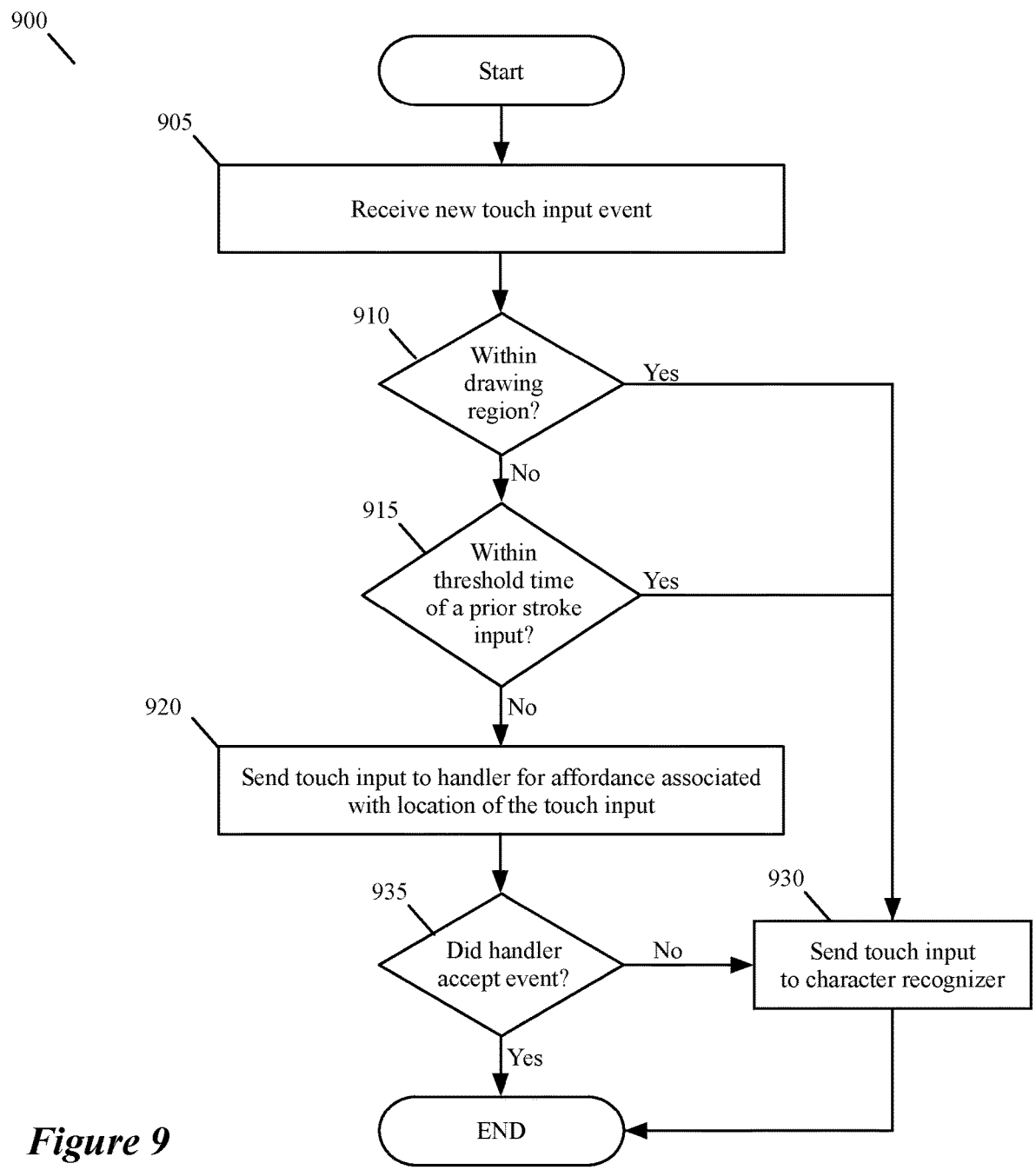

FIGS. 7-9 illustrate an example of a smart watch 700 that executes the character recognizer 400 or 600 of some embodiments of the invention. FIG. 7 illustrates that the smart watch 700 in some embodiments uses the character recognition process of some embodiments to recognize characters that the user inputs on a touch-sensitive display screen 705 of the watch, in order to prepare and send an electronic message (e.g., an email or a text message) from the watch.

In this example, the display screen 705 displays a message-composition UI 710 for composing and sending the electronic message. This UI 710 includes (1) a drawing display area 712 for the user to use to draw characters through touch stroke input, (2) a character display area 714 for displaying characters that the user has drawn in the drawing display area 712, and (3) five affordances 716-724 for the user to select to create a new message, to cancel the message, to delete the message, to insert a space in the message, and to send the message.

As shown, the watch also includes a crown 730 that performs a variety of functions in a variety of different settings. When the watch displays the message-composition UI 710, the actuation of the crown causes a drop-down window to appear below the character display area 714 to display a list of the candidate strings that are most likely to the user's stroke input(s) thus far. The user can then roll the crown to the position of the desired string in the list of candidate strings, and then actuate the crown to select this string. The user can also select the desired string through touch selection on the list displayed in the drop down window. When the drop-down window is not open under the character display area 714, this display area displays just one string, which is the string with the best-computed score for the user's stroke input(s) thus far.

Even though the message-composition UI 710 provides the drawing display area 712 for the user to use to input the characters, the message-composition UI 710 allows the user to end input strokes for entering characters outside of this display area 712 so long as the stroke started inside the drawing area. This is because the display area is small and the user might not be able to finish the stroke in this small area, especially when the user is walking or otherwise moving.

In addition, the message-composition UI 710 also allows an input stroke for drawing a character to start outside of the drawing display area 710, so long as the input stroke is not absorbed by the affordances 716-724 that are near the touch-down location of the input stroke. Also, when a new input stroke that starts outside of the drawing area 712 is initiated within a threshold time period of an earlier input stroke that was designated as a drawing stroke for inputting a character by the UI 710, the new stroke is treated as another input stroke for inputting a character through drawing.

FIGS. 8 and 9 illustrate how the smart watch 700 processes new touch input events for the message-composition UI 710. As shown in FIG. 8, the smart watch 700 executes a touch-sensor handler 805, several affordance handlers 810 for several affordances that the UI 710 provides, and a character recognizer 815 (such as recognizer 400 or 600) for processing touch strokes that are meant to input characters through the watch's touch-sensitive screen 705.

FIG. 9 illustrates a process 900 that the touch-sensor handler 805 uses to assign touch input events to either one of the affordance handlers 810 or to the character recognizer 815. As shown, the process 900 starts (at 905) when the touch-sensor handler 805 receives a new touch input event. In some embodiments, this handler receives a new touch input event when it receives a signal for a touch contact with the display screen from the sensor circuitry, after a period of time during which there has been no touch contact with the display screen.

Next, at 910, the process determines whether the location of the touch that initiated this event was within the drawing area 712. If so, the process assigns (at 930) this event to the character recognizer 815, proceeds to send all touch data for this event to the recognizer 815, and then ends. On the other hand, when the touch-down location for the new event is outside of the drawing area 712, the process determines (at 915) whether the new event is within a first threshold time period of a prior input stroke event for drawing a stroke for character recognizer. When the new event is within this first threshold time period, the process assigns (at 930) this event to the character recognizer 815, proceeds to send all touch data for this event to the recognizer 815, and then ends.

However, when the process determines (at 915) that the new event is not within the first threshold time period of the previous input stroke event, the process assigns (at 920) the touch-input event to the handler of the affordance associated with the touch-down location of the touch input event. The affordance handlers do not always commit to an input touch event that is assigned to them. For example, they might determine that the input belongs to a type of operation (e.g., a drag operation) that they do not recognize as a valid input.

Accordingly, after assigning (at 920) the touch-input event to the handler, the process determines (at 935) whether the affordance handler rejected the input event. When the affordance handler does not reject the input event, the process 900 continues to supply data for the event to this handler, and then ends. Otherwise, when the affordance handler rejects (at 935) the input event, the process assigns (at 930) this event to the character recognizer 815, proceeds to send all touch data for this event to the recognizer 815, and then ends.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
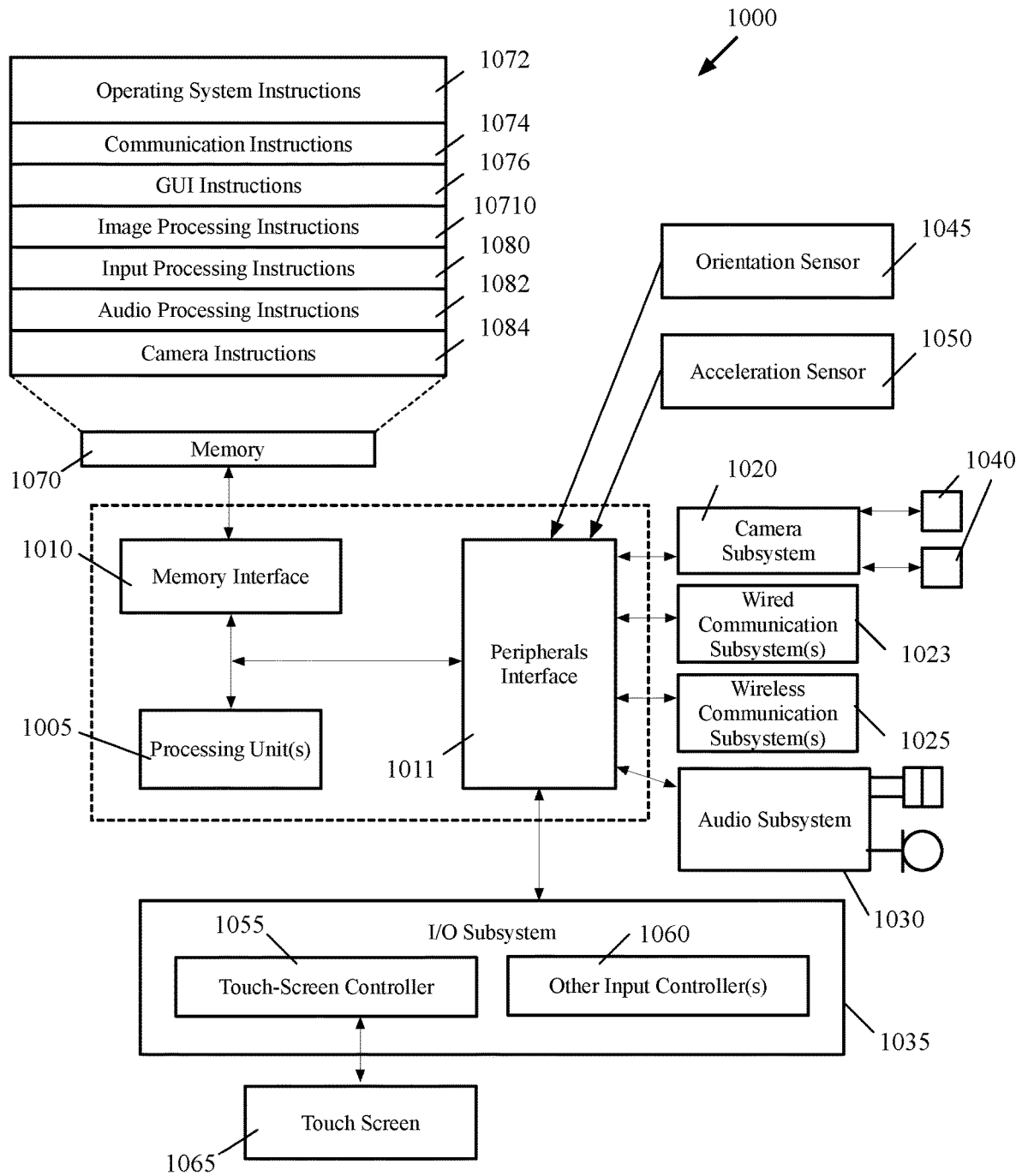
FIG. 10 is an example of an architecture of a mobile computing device that implements some embodiments of the invention.

The applications of some embodiments operate on mobile devices, such as smart phones (e.g., iPhones®) and tablets (e.g., iPads®). FIG. 10 is an example of an architecture 1000 of such a mobile computing device. Examples of mobile computing devices include smartphones, tablets, laptops, etc. As shown, the mobile computing device 1000 includes one or more processing units 1005, a memory interface 1010 and a peripherals interface 1015.

The peripherals interface 1015 is coupled to various sensors and subsystems, including a camera subsystem 1020, a wireless communication subsystem(s) 1025, an audio subsystem 1030, an I/O subsystem 1035, etc. The peripherals interface 1015 enables communication between the processing units 1005 and various peripherals. For example, an orientation sensor 1045 (e.g., a gyroscope) and an acceleration sensor 1050 (e.g., an accelerometer) is coupled to the peripherals interface 1015 to facilitate orientation and acceleration functions.

The camera subsystem 1020 is coupled to one or more optical sensors 1040 (e.g., a charged coupled device (CCD) optical sensor, a complementary metal-oxide-semiconductor (CMOS) optical sensor, etc.). The camera subsystem 1020 coupled with the optical sensors 1040 facilitates camera functions, such as image and/or video data capturing. The wireless communication subsystem 1025 serves to facilitate communication functions. In some embodiments, the wireless communication subsystem 1025 includes radio frequency receivers and transmitters, and optical receivers and transmitters (not shown in FIG. 10). These receivers and transmitters of some embodiments are implemented to operate over one or more communication networks such as a GSM network, a Wi-Fi network, a Bluetooth network, etc. The audio subsystem 1030 is coupled to a speaker to output audio (e.g., to output voice navigation instructions). Additionally, the audio subsystem 1030 is coupled to a microphone to facilitate voice-enabled functions, such as voice recognition (e.g., for searching), digital recording, etc.

The I/O subsystem 1035 involves the transfer between input/output peripheral devices, such as a display, a touch screen, etc., and the data bus of the processing units 1005 through the peripherals interface 1015. The I/O subsystem 1035 includes a touch-screen controller 1055 and other input controllers 1060 to facilitate the transfer between input/output peripheral devices and the data bus of the processing units 1005. As shown, the touch-screen controller 1055 is coupled to a touch screen 1065. The touch-screen controller 1055 detects contact and movement on the touch screen 1065 using any of multiple touch sensitivity technologies. The other input controllers 1060 are coupled to other input/control devices, such as one or more buttons. Some embodiments include a near-touch sensitive screen and a corresponding controller that can detect near-touch interactions instead of or in addition to touch interactions.

The memory interface 1010 is coupled to memory 1070. In some embodiments, the memory 1070 includes volatile memory (e.g., high-speed random access memory), non-volatile memory (e.g., flash memory), a combination of volatile and non-volatile memory, and/or any other type of memory. As illustrated in FIG. 10, the memory 1070 stores an operating system (OS) 1072. The OS 1072 includes instructions for handling basic system services and for performing hardware dependent tasks.

The memory 1070 also includes communication instructions 1074 to facilitate communicating with one or more additional devices; graphical user interface instructions 1076 to facilitate graphic user interface processing; image processing instructions 1078 to facilitate image-related processing and functions; input processing instructions 1080 to facilitate input-related (e.g., touch input) processes and functions; audio processing instructions 1082 to facilitate audio-related processes and functions; and camera instructions 1084 to facilitate camera-related processes and functions. The instructions described above are merely exemplary and the memory 1070 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 10 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 10 may be split into two or more integrated circuits.

Figure 11:
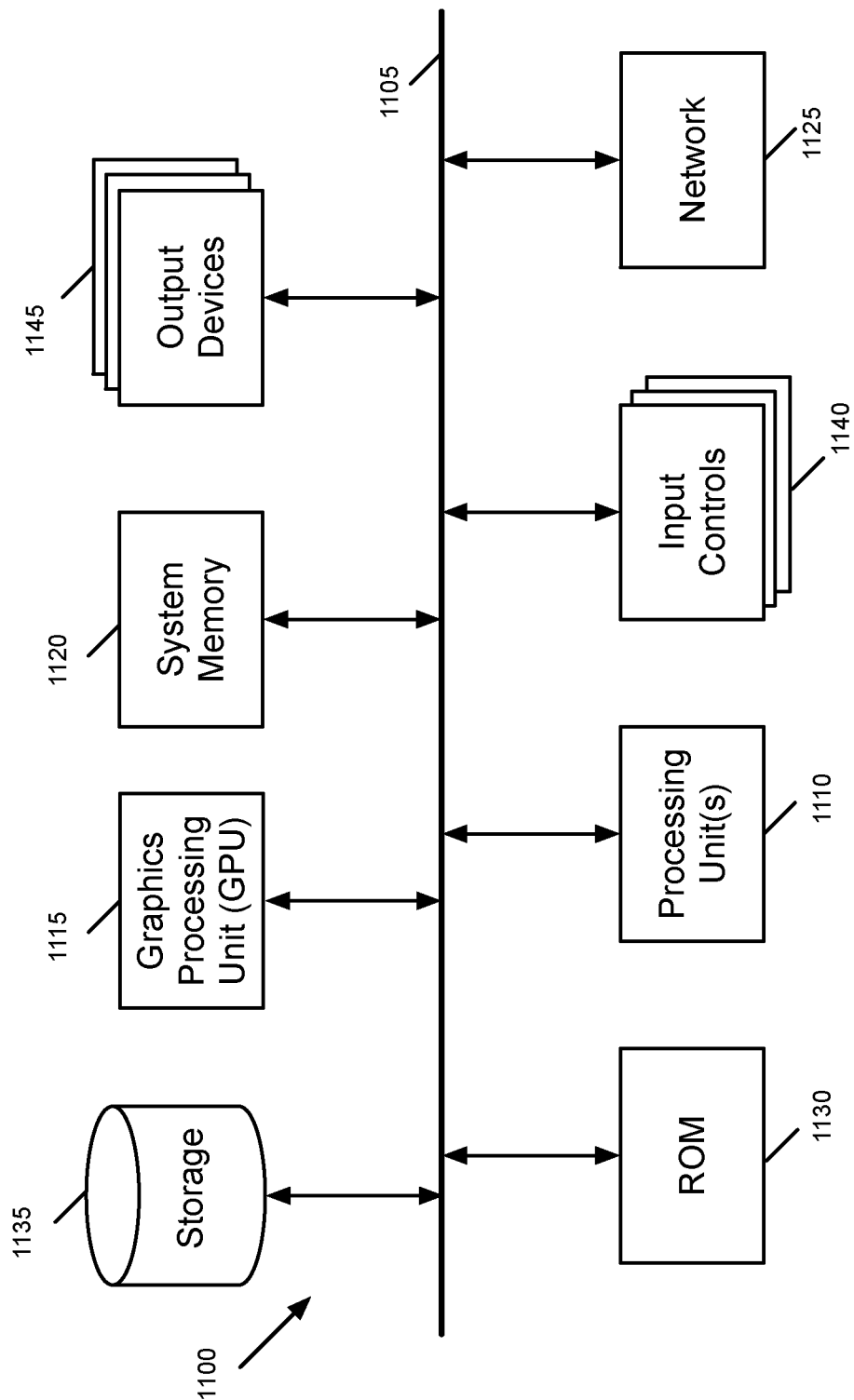
FIG. 11 conceptually illustrates another example of an electronic system with which some embodiments of the invention are implemented.

FIG. 11 conceptually illustrates another example of an electronic system 1100 with which some embodiments of the invention are implemented. The electronic system 1100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1100 includes a bus 1105, processing unit(s) 1110, a graphics processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the GPU 1115, the system memory 1120, and the permanent storage device 1135.

From these various memory units, the processing unit(s) 1110 retrieves instructions to execute and data to process in order to execute the processes of the invention. The processing unit(s) may be a single processor or a multi-core processor in different embodiments. Some instructions are passed to and executed by the GPU 1115. The GPU 1115 can offload various computations or complement the image processing provided by the processing unit(s) 1110.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive, integrated flash memory) as the permanent storage device 1135.

Other embodiments use a removable storage device (such as a floppy disk, flash memory device, etc., and its corresponding drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor needs at runtime. In some embodiments, the invention's processes are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alpha-numeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet), or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures. However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Several of the embodiments described above recognize at most one character for one stroke that starts with one touch down event and ends with the next touch up event. Other embodiments, however, support the user's cursive writing, and can recognize more than one character that is written in one stroke. In some of these embodiments, the stroke graph generator can define single stroke edges that traverse through more than two nodes. One of ordinary skill in the art would understand that the invention is not to be limited by the foregoing illustrative details, but rather is to be defined by the appended claims.

The invention claimed is:

1. A method comprising:
   detecting a touch input from both outside and inside of a constrained writing region of a touch-sensitive space of a device;
   providing the detected touch input to a handler for a touch-sensitive affordance that is outside of the constrained writing region and receiving, from the handler, a rejection of the touch input; and
   responsive to receiving the rejection, providing the touch input from both outside and inside of the constrained writing region to a character recognizing engine to translate the touch input from both outside and inside of the constrained writing region to an input character.

2. The method of claim 1, further comprising:
   providing multiple touch-sensitive affordances on the touch-sensitive space of the device, the touch-sensitive affordances comprising the constrained writing region.

3. The method of claim 2, wherein generating the input character comprises:
   determining that the touch input follows within a threshold amount of time a previous touch input that was used to generate another input character; and
   based on the determination, providing the detected touch input from both outside and inside of the constrained writing region to a character recognizing engine to translate the touch input from both outside and inside of the constrained writing region to the input character.

4. The method of claim 3, further comprising:
   based on the determination, foregoing providing the touch input to a handler for one of the multiple touch-sensitive affordances that is outside of the constrained writing region.

5. The method of claim 1, wherein generating the input character comprises:
   generating a graph having a plurality of nodes and a plurality of edges between the nodes, each node corresponding to at least one touch-input stroke's touch-down event or one touch-input stroke's touch-up, each edge between a pair of nodes representing one or more characters;
   for each respective edge in the graph, defining a set of candidate characters represented by the respective edge; and
   identifying a plurality of characters written in the touch-sensitive space by selecting a path through the edges of the graph.

6. The method of claim 5, further comprising:
   for each respective edge in the graph, associating a score for each candidate character; and
   wherein identifying the plurality of characters comprises selecting the path through the edges of the graph that produces a best score based on the score of a selected character for each respective edge on the path.

7. The method of claim 5, wherein the plurality of edges comprises a single-stroke edge between a pair of adjacent nodes in the graph for representing one or more single stroke characters, and a multi-stroke edge between a pair of non-adjacent nodes in graph representing one or more multi-stroke characters.

8. The method of claim 5, wherein defining the set of candidate characters for each edge comprises using spatial, temporal, and language constraints to limit the candidate characters to include in the set.

9. The method of claim 5, wherein each of the plurality of nodes corresponds to a touch-up of a prior stroke and a touch-down of a subsequent stroke.

10. The method of claim 1, further comprising:
identifying a series of characters input on the touch-sensitive space of the device;
determining that the identified series of characters includes an improper combination of at least one upper case character and one lower case character; and
responsive to the determining, presenting the series of characters with at least one of the inputted characters having a modified character case.

11. A device comprising:
at memory; and
at least one processor configured to:
receive a plurality of touch-input strokes on a touch-sensitive space of the device;
generate a graph having a plurality of nodes and a plurality of edges between the nodes, each node corresponding to a touch-down event or a touch-up event of at least one of the plurality of touch-input strokes, each edge between a pair of nodes representing one or more characters;
for each respective edge in the graph, assign a set of candidate characters represented by the respective edge; and
identify a plurality of characters written in the touch-sensitive space by selecting a path through the edges of the graph.

12. The device of claim 11, wherein the at least one processor is further configured to:
for each respective edge in the graph, associate a score for each candidate character; and
identify the plurality of characters by selecting the path through the edges of the graph that produces a best score based on the score of a selected character for each respective edge on the path.

13. The device of claim 11, wherein the plurality of edges comprises a single-stroke edge between a pair of adjacent nodes in the graph for representing one or more single stroke characters, and a multi-stroke edge between a pair of non-adjacent nodes in graph representing one or more multi-stroke characters.

14. The device of claim 11, wherein the at least one processor is configured to generate the graph using spatial, temporal, and stroke count constraints to define edges between nodes in the graph.

15. The device of claim 11, wherein the at least one processor is configured to define the set of candidate characters for each edge using spatial, temporal, and language constraints to limit the candidate characters to include in the set.

16. The device of claim 11, wherein each of the plurality of nodes corresponds to a touch-up of a prior stroke and a touch-down of a subsequent stroke.

17. The device of claim 11, wherein the touch-sensitive space comprises a constrained writing region and at least a portion of at least one of the plurality of touch-input strokes is received outside of the constrained writing region.

18. A non-transitory machine readable medium comprising code that, when executed by one or more processors, causes the one or more processors to perform operations, the code comprising:
code to generate stroke input data corresponding to received touch input data;
code to add a node to a stroke graph, the node corresponding to the stroke input data;
code to generate one or more edges in the stroke graph that connect the added node to one or more other nodes based at least in part on one or more stroke constraints;
code to generate one or more edges in a character graph associated with one or more candidate characters that correspond to the one or more edges in the stroke graph;
code to determine a score for each of the one or more candidate characters and assigning the score to the associated one or more edges in the character graph; and
code to select one or more of the candidate characters to form a string based at least in part on a sum of the scores corresponding to the one or more edges in the character graph that represent the one or more of the candidate characters.

19. The non-transitory machine readable medium of claim 18, wherein the touch input data is received on a touch-sensitive space and at least a portion of the touch input data is received outside of a constrained writing region of the touch-sensitive space.

20. A system comprising:
a memory comprising instructions; and
a processor configured to execute the instructions to perform operations comprising:
detecting a touch input from both outside and inside of a constrained writing region of a touch-sensitive space of a device;
determining that the touch input follows within a threshold amount of time a previous touch input that was used to generate an input character; and
based on the determining, providing the detected touch input from both outside and inside of the constrained writing region to a character recognizing engine to translate the touch input from both outside and inside of the constrained writing region to another input character.

21. The system of claim 20, wherein the operations further comprise:
providing multiple touch-sensitive affordances on the touch-sensitive space of the device, the touch-sensitive affordances comprising the constrained writing region.

* * * * *